US006924875B2

(12) United States Patent
Tomita

(10) Patent No.: US 6,924,875 B2
(45) Date of Patent: Aug. 2, 2005

(54) ARRAY SUBSTRATE HAVING DIODES CONNECTED TO SIGNAL LINES, METHOD OF INSPECTING ARRAY SUBSTRATE, AND LIQUID CRYSTAL DISPLAY

(75) Inventor: Satoru Tomita, Kawagoe (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/844,336

(22) Filed: May 13, 2004

(65) Prior Publication Data

US 2004/0207772 A1 Oct. 21, 2004

Related U.S. Application Data

(62) Division of application No. 09/905,865, filed on Jul. 17, 2001, now abandoned.

(51) Int. Cl.[7] .............................................. G02F 1/1343
(52) U.S. Cl. ......................... 349/192; 349/54; 349/149; 345/98; 324/770
(58) Field of Search ............................. 349/40, 54, 55, 349/192, 149–152; 345/51, 98, 100; 324/770

(56) References Cited

U.S. PATENT DOCUMENTS 5,831,709 A * 11/1998 Song .......................... 349/149
6,049,321 A * 4/2000 Sasaki ......................... 345/99
6,340,963 B1 * 1/2002 Anno et al. ................... 345/92
2001/0030722 A1 10/2001 Murade

* cited by examiner

*Primary Examiner*—Andrew Schechter
(74) *Attorney, Agent, or Firm*—Oblon, Spivak, McClelland, Maier & Neustadt, P.C.

(57) ABSTRACT

An array substrate is provided for which an OS inspection can be performed without increasing the area of a signal driving circuit formed on the array substrate, and for which the manufacturing cost can be reduced. The array substrate includes a substrate, scanning lines, signal lines, pixel electrodes connected via switching elements provided at the intersections of the scanning lines and the signal lines, a plurality of input/output terminals provided at an edge portion of the substrate, a scanning line driving circuit, a signal line driving circuit for supplying picture signals sent from the outside to one ends of the signal lines via the input/output terminals, and a wiring line commonly connecting the other ends of the signal lines to at least one of the input/output terminals. A predetermined level of voltage is applied between the input/output terminal to which the wiring line is connected and another input/output terminal which at least supplies picture signals, and a current flowing at that time is measured to detect failures.

7 Claims, 12 Drawing Sheets

ARRAY SUBSTRATE HAVING DIODES CONNECTED TO SIGNAL LINES, METHOD OF INSPECTING ARRAY SUBSTRATE, AND LIQUID CRYSTAL DISPLAY

CROSS-REFERENCE TO RELATED APPLICATION

The present application claims benefit of priority under 35 U.S.C. § 120 to co-pending U.S. patent application Ser. No. 09/905,865 filed Jul. 17, 2001 now abandoned. The entire contents of which are incorporated herein by reference.

BACKGROUND OF THE INVENTION

1. Field of the Invention

The present invention relates to an array substrate, a method of inspecting an array substrate, and a liquid crystal display (hereinafter also referred to as "LCD").

2. Description of Related Art

A liquid crystal display is generally light and thin, and requires less electric power. Therefore, liquid crystal displays are widely used as display elements in television receivers, hand-held terminal, graphic displays, etc. Especially, attention is drawn to active matrix type liquid crystal displays using thin film transistors (hereinafter also referred to as "TFTs") as switching elements. Since an active matrix type liquid crystal display is superior in its quick responsiveness, and picture elements can be more densely arranged in an active matrix type liquid crystal display, it is expected that with such a type of display, image quality of the display screen may be improved, the size of the display screen may be enlarged, and colorization of the display can be achieved.

As shown in FIG. 10, an active matrix type liquid crystal display typically has an array substrate 100, an opposite substrate 200, and liquid crystal (not shown) disposed therebetween. The array substrate 100 includes a transparent insulating substrate (e.g., a glass substrate) 101 having a display area 102*a*. A plurality of signal lines 103 and a plurality of scanning lines 104 are arranged in a matrix form on the display area 102*a*. Switching elements 105 formed of thin film transistors and pixel electrodes 106 each corresponding to one of the switching elements are provided at the intersections of the signal lines 103 and the scanning lines 104. A gate of each switching element 105 is connected to the corresponding scanning line 104. One of a source and a drain of each switching element is connected to the corresponding signal line 103, and the other is connected to the corresponding pixel electrode 106.

The array substrate 100 may further include a driving circuit 110 having TFTs and external terminals 120, connected to the driving circuit 110, for receiving electrical power or signals from external devices on a non-display area 102*b* which is the area on the periphery of the transparent insulating substrate 101.

The opposite substrate 200 includes a transparent insulating substrate 201 and a common electrode 203 formed thereon as a transparent conductive film of ITO (Indium Tin Oxide).

The above-mentioned substrates 100 and 200 are placed so as to be opposite to each other, with a predetermined space being left therebetween. A sealing material 300, which is applied to the non-display area 102*b* so as to surround the display area 102*a* of the array substrate 100, sticks the substrates together. As shown in FIG. 10, the portion applied the sealing material 300 has an inlet 301 for inserting a liquid crystal material therethrough. After the above-mentioned substrates 100 and 200 are stuck together, a liquid crystal composite (not shown) is fed into the space between the substrates through the inlet 301. Consequently, the substrates are sealed to obtain a liquid crystal display. In the case of a color liquid crystal display, a color filter layer is added to either of the opposite substrate 200 and the array substrate 100.

FIG. 11 shows the structure of an array substrate of a conventional liquid crystal display. The array substrate shown in FIG. 11 includes a transparent substrate, a plurality of scanning lines 11 for use in scanning operations, and a plurality of signal lines 12 for transmitting picture signals, the scanning lines 11 and the signal lines 12 being arranged in a matrix form on one surface of the transparent substrate. Thin film transistors 13 as switching elements are provided at the intersections of the scanning lines 11 and the signal lines 12. A gate of each thin film transistor is connected to the corresponding scanning line 11, a source thereof is connected to the corresponding signal line 12, and a drain thereof is connected to a pixel electrode 14. One end of a storage capacitor 15 is connected to each pixel electrode 14, and the other end thereof is connected to a storage capacitor line (hereinafter also referred to as "Cs line") 16.

Each scanning line 11 is connected to a scanning line driving circuit 18 provided at the left side of the array substrate 100 in FIG. 11. Each signal line 12 is connected to a signal line driving circuit 19 provided in the lower side of the array substrate 100 in FIG. 11. The storage capacitors 16 are commonly connected, via a line 31, to an OLB (outer lead bonding) pad 26 in an OLB pad group 20 formed as an input/output terminal group on the bottom end of the substrate in FIG. 11.

A voltage with the horizontal scanning cycle is applied from the scanning line driving circuit 18 to each scanning line 11, from the top to the bottom. A voltage corresponding to a picture signal is applied to each signal line 12 from a video bus serving as a picture signal supplying line included in the signal line driving circuit 19. Accordingly, a thin film transistor 13 is turned on at the timing a selecting signal is applied from the scanning line 11 to sample a voltage corresponding to the picture signal sent from the signal line 12, and to apply the voltage to the pixel electrode 14. Thus, the difference between the voltage applied to the pixel electrode 14 and the voltage applied to the common electrode (not shown) is applied to the liquid crystal layer. Accordingly, the liquid crystal layer is driven by the electric field caused, thereby to perform a display operation.

In the conventional liquid crystal display shown in FIG. 11, the scanning line driving circuit 18 and the signal line driving circuit 19 are formed on the array substrate 100, and a semiconductor layer serving as an active layer of a thin film transistors 13 is formed of polycrystalline silicon. Such a display is called p-Si type TFT-LCD. If the semiconductor layer of the thin film transistor is formed of amorphous silicon, such a display is called a-Si type TFT-LCD. A TFT having a semiconductor layer formed of amorphous silicon cannot be used in a driving circuit since the mobility thereof is not so good as compared with a TFT having a semiconductor layer formed of polycrystalline silicon. Therefore, it is difficult to provide a driving circuit on the array substrate 100 of an a-Si type TFT-LCD. Accordingly, the array substrate of an a-Si type TFT-LCD is formed only of pixel parts, and no driving circuit is housed therein, as shown in FIG. 12. A driving circuit for this type of display is formed, separate from the array substrate 100, as a semiconductor integrated circuit (driver IC), and connected to OLB pads 211-21*n* and 221-22*n* of the array substrate 100 by the TAB (tape automated bonding) method, etc.

One of the differences between the p-Si type TFT-LCD shown in FIG. 11 and the a-Si type TFT-LCD shown in FIG. 12 lies in the OLB pads. In the a-Si type TFT-LCD, the signal lines and the scanning lines are directly connected to the OLB pads. Therefore, the number and the pitch of the OLB pads are the same as those of the signal lines and the scanning lines. In the p-Si type TFT-LCD, the signal lines and the scanning lines are not directly connected to the OLB pads since they are driven by the built-in driving circuits 18 and 19. Inputs from the OLB pads are equal to inputs from the built-in driving circuits 18 and 19. Generally, the number of the OLB pads is about one order less than that of the signal lines or the scanning lines. Accordingly, it is possible to widen the pitch of the OLB pads so as to secure the connection reliability. The above-mentioned differences in OLB pads are shown in Table 1. The p-Si type TFT-LCD has an advantage that the degree of accuracy of the prober may be decreased, and the cost of equipment investment may be reduced as compared to the a-Si type TFT-LCD. Table 1 shows the case of XGA (Extended Graphics Array) capable 10.4-inch LCD generally used for personal computers, in which the values shown are approximate values.

TABLE 1

| | Number of Pads | Pad Pitch |
|---|---|---|
| a-Si type TFT-LCD | 4000 | 60 (μm) |
| P-Si type TFT-LCD | 200 | 160 (μm) |

The above-mentioned differences in OLB pads have effects on the inspection during the formation of the array. In the case of manufacturing an a-Si type TFT-LCD, after signal lines are formed during the array formation process, an inspection for short circuit and disconnection (hereinafter also referred to as "OS inspection") is performed. This inspection includes putting probes on an OLB pad connected to one end of the signal lines and a probing pad connected to the other end of the signal lines, applying a predetermined level of voltage therebetween, and measuring the current flowing at that time. If the signal lines are correctly formed, a predetermined value of current, which is determined by the value of the applied voltage and the resistance of the signal lines, can be observed. If the signal line is disconnected (i.e., the circuit is open), no current flows, whereby a disconnection failure can be detected. Further, if, at the time of carrying out the inspection, a voltage, having the value different from that of the voltage applied to the signal line, is applied to the scanning lines and the storage capacitor lines, when the signal lines are short-circuited with these lines, an abnormal current flows, whereby a short circuit failure can be detected.

On the other hand, no OS inspection is included in the process of forming an array of a p-Si TFT-LCD. The reason for this is that no OLB pad for putting the probe thereon is provided at the end of the signal lines.

As mentioned previously, in the process of forming an array of a p-Si type TFT-LCD, no OS inspection is performed. Although an array test is performed at the last step of the array forming process, the rate of detecting signal line failure is not so good since in a p-Si type TFT-LCD, the picture element portion is inspected via built-in driving circuits, which causes the deterioration of the S/N (signal to noise) ratio. Thus, the rate of detecting signal line disconnection, short circuit, etc. of a p-Si type TFT-LCD is lower than that of an a-Si type TFT-LCD. As a result, the number of defective arrays sent to the cell process becomes rather large, thereby incurring unnecessary manufacturing costs.

Furthermore, if an OS inspection is intended to be performed for a p-Si type TFT-LCD, it is necessary to provide probing pads for putting probes thereon at both ends of the signal lines. The size of a probing pad has to be about the same as that of an OLB pad. Providing such probing pads between the signal lines 12 and the signal line driving circuit 19 would cause the increase in size of the area of the signal line driving circuit 19. As the result, the compactibility of the liquid crystal module to be manufactured would be deteriorated.

Moreover, even if probing pads are provided, the pitch thereof should be the same as that of the signal lines. Accordingly, it is necessary to use, in an inspection of array substrate of a p-Si type TFT-LCD, a high accuracy prober intended for use in array substrate inspection of a-Si type TFT-LCD. This would increase the equipment investment cost.

SUMMARY OF THE INVENTION

The present invention is proposed in order to solve the above-described problems, and an object of the present invention is to provide an array substrate, a method of inspecting an array substrate, and a liquid crystal display, in which an OS inspection of the array substrate can be performed without increasing in size of a signal line driving circuit formed on the array substrate, and by which the manufacturing cost would be lowered.

An array substrate according to the present invention includes: a substrate; a plurality of scanning lines formed on the substrate; a plurality of signal lines formed on the substrate so as to intersect the scanning lines, each signal line having one end and the other end; thin film transistors provided at intersections of the scanning lines and the signal lines, a gate of each thin film transistor being connected to the corresponding scanning line, and a source thereof being connected to the corresponding signal line; pixel electrodes each corresponding to one of the thin film transistors, and each being connected to a drain of the corresponding thin film transistor; an input/output terminal group provided at an edge portion of the substrate, including input/output terminals used for inputting signals from the outside and outputting signals to the outside; a scanning line driving circuit for driving the scanning lines; a signal line driving circuit, connected to the one end of each signal line, for driving the signal lines; and a first wiring line formed on the substrate, for commonly connecting the other ends of the signal lines to at least one of the input/output terminals in the input/output terminal group.

The array substrate may further include: storage capacitors each corresponding to one of the pixel electrodes and one end of each being connected to the corresponding pixel electrode; and storage capacitor lines each connected to the other end of each storage capacitor. The storage capacitor lines may be commonly connected to one of the input/output terminals in the input/output terminal group.

It is preferable that the other end of each signal line is connected to the first wiring line via a resistor.

Further, it is preferable the other end of each signal line is connected to the first wiring line via a switching element which can be turned on/off from the outside.

Moreover, it is preferable that the other end of each signal line is connected to the first wiring line via an diode.

The array substrate may be constituted such that the first wiring line includes a second wiring line and a third wiring line connected to the different input/output terminals, and a first diode and a second diode are provided to the other end of each signal line, an anode of the first diode being connected to the other end of the signal line, a cathode thereof being connected to the second wiring line, an anode of the second diode being connected to the third wiring line, and a cathode thereof being connected to the other end of the signal line.

The second wiring line and the third wiring line may also be used as lines for input/output signals of the scanning line driving circuit or the signal line driving circuit.

The array substrate may further include a video bus connected to at least one of the input/output terminals of the input/output terminal group, and the signal line driving circuit may include selecting switches each corresponding to a signal line, one end of each selecting switch being connected to the corresponding signal line, and the other end thereof being connected to the video bus.

The array substrate may be constituted such that the other ends of the selecting switches, one ends of which are connected to the (2k−1)-th signal line and the (2K)-th signal line, counted from one side, where k is a natural number, are commonly connected to the video bus.

The array substrate may be constituted such that: the first wiring line includes second to fifth wiring lines connected to the different input/output terminals; a first diode and a second diode are provided to the other end of each signal line, an anode of the first diode being connected to the other end of the signal line, and a cathode of the second diode being connected to the other end of the signal line; the signal lines are divided into at least a first and a second signal line groups; a cathode of the first diode, the anode of which is connected to the other end of the signal line included in the first signal line group, is connected to the second wiring line; an anode of the second diode, the cathode of which is connected to the other end of the signal line included in the second signal line group is connected to the third wiring line; a cathode of the first diode, the anode of which is connected to the other end of the signal line included in the second signal line group is connected to the fourth wiring line; and an anode of the second diode, the cathode of which is connected to the other end of the signal line included in the second signal line group is connected to the fifth wiring line.

A liquid crystal display according to the present invention includes: the above-described array substrate; an opposite substrate formed on a second substrate, including a common electrode; a liquid crystal layer provided between the array substrate and the opposite substrate.

A method of inspecting the above-described array substrate including the steps of: applying a predetermined level of voltage between the input/output terminal to which the first wiring line is connected and another input/output terminal which at least supplies picture signals; and measuring a current flowing through the input/output terminals to which the predetermined level of voltage is applied.

DESCRIPTION OF THE PREFERRED EMBODIMENTS

Hereinafter, preferred embodiments of the present invention will be described with reference to the accompanying drawings.

(First Embodiment)

Figure 1:
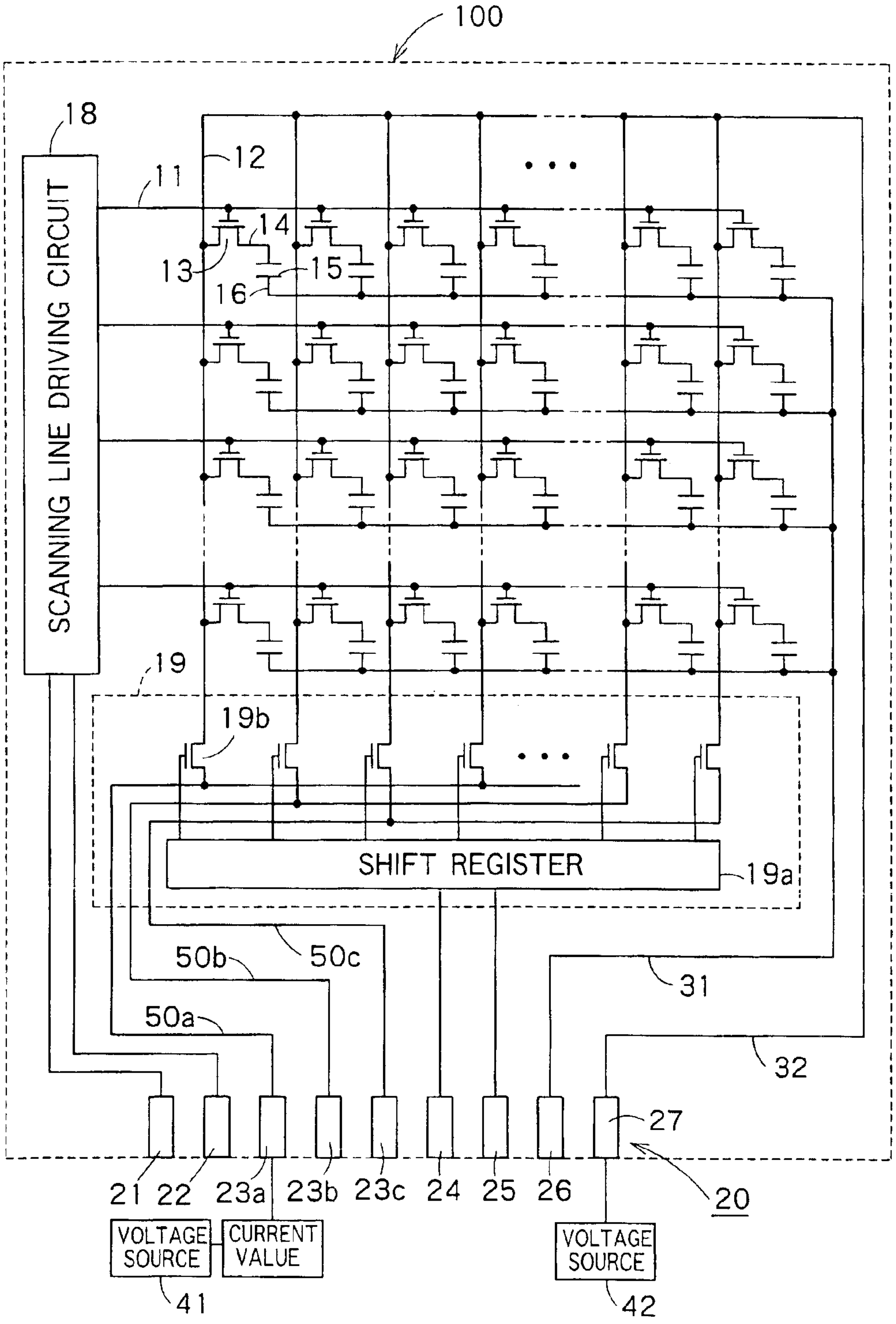
FIG. 1 is an equivalent circuit diagram showing the structure of a first embodiment of a liquid crystal display according to the present invention.

FIG. 1 is an equivalent circuit diagram showing the structure of an array substrate 100 in a first embodiment of a liquid crystal display according to the present invention.

The array substrate 100 in this embodiment includes a plurality of scanning lines 11 for use in scanning operations, and a plurality of signal lines 12 for receiving picture signals, which intersect the scanning lines 11. A thin film transistor 13 is provided as a switching element near each intersection of the scanning lines 11 and the signal lines 12. A source of each thin film transistor 13 is connected to a signal line 12, a drain thereof is connected to an pixel electrode 14, and a gate thereof is connected to a scanning line 11. Each pixel electrode 14 is connected to one end of a storage capacitor 15. The other end of the storage capacitor 15 is connected to a storage capacitor line 16.

An opposite substrate (not shown) having a common electrode (not shown) is placed so as to be opposite to the array substrate 100 with a predetermined space being left therebetween. A liquid crystal layer is formed in the above space between the array substrate 100 and the opposite substrate. A scanning line driving circuit for sequentially driving the scanning lines 11 from the top to the bottom is provided at one end of the scanning lines 11, i.e., at the left side in FIG. 1. A signal line driving circuit 19 for supplying picture signals is provided at one end of the signal lines 12, i.e., in the lower portion of FIG. 1. The signal line driving circuit 19 includes a shift register 19*a* and switching elements 19*b*. The shift register 19*a* controls the switching elements 19*b* so that picture signals are supplied to the signal lines 12.

An OLB pad group 20 including OLB pads 21 to 27 is provided under the signal line driving circuit 19, i.e., at the bottom portion of the array substrate in FIG. 1. The OLB pads 21 and 22 are connected to input terminal of the scanning line driving circuit 18. The OLB pad 23*a* is connected via a video bus 50*a* to a source of the switching element 19*b* connected to the (3k+1)-th signal line 12 (where k is a non-negative integer) counted from the left end in the drawing. The OLB pad 23*b* is connected via a video bus 50*b* to a source of the switching element 19*b* connected to the (3k+2)-th signal line 12 counted from the left end in the drawing. The OLB pad 23*c* is connected via a video bus 50*c* to a source of the switching element 19*b* connected to the (3k+3)-th signal line 12 counted from the left end in the drawing. The OLB pad 24 is a power source pad of the signal line driving circuit 19. Although only one OLB pad 24 is shown in the drawing, there are actually a plurality of OLB pads 24, and there are a plurality of power supply lines corresponding to the OLB pads 24. The OLB pad 25 is a control signal pad of the signal line driving circuit 19. Although only one OLB pad 25 is shown in the drawing, there are actually a plurality of OLB pads 25, and there are a plurality of control lines corresponding to the OLB pads 25. Similarly, the OLB pad 21 is a power source pad of the scanning line driving circuit 18. Although only one OLB pad 21 is shown in the drawing, there are actually a plurality of OLB pads 21, and there are a plurality of power supply lines corresponding to the OLB pads 21. The OLB pad 22 is a control signal pad of the scanning line driving circuit 18. Although only one OLB pad 22 is shown in the drawing, there are actually a plurality of OLB pads 22, and there are a plurality of control lines corresponding to the OLB pads 22. The OLB pad 26 is connected to all of the Cs lines 16 via a wiring line 31 provided on the array substrate. The OLB pad 27 is connected to a wiring line 32 that is commonly connected to the other ends of the signal lines 12, and provided on the array substrate.

With the above-described structure, if, e.g., the OLB pad 23*a* is connected to a voltage source 41, the OLB pad 27 is connected to another voltage source 42, a predetermined level of test voltage is applied between the OLB pad 23*a* and the OLB pad 27, and the value of a current flowing from the voltage source 41 to the OLB pad 23*a* is measured, it is possible to detect disconnection and short circuit of the signal lines 12 and the video bus 50*a*, which supplies picture signals to the signal lines 12. Similarly, if the OLB pad 23*b* is connected to the voltage source 41, the OLB pad 27 is connected to the voltage source 42, a predetermined level of test voltage is applied between the OLB pad 23*b* and the OLB pad 27, and the value of a current flowing from the voltage source 41 to the OLB pad 23*b* is measured, it is possible to detect disconnection and short circuit of the signal lines 12 and the video bus 50*b*, which supplies picture signals to the signal lines 12. It is also possible to detect disconnection and short circuit of the signal lines 12 and the video bus 50*c* supplying picture signals to the signal lines 12 in a similar manner.

According to the first embodiment, it is not necessary to provide a probing pad between the signal lines 12 and the signal line driving circuit 19 in order to inspect disconnection and short circuit of the video buses and the signal lines 12. Accordingly, the increase in area of the signal line driving circuit 19 can be avoided, and the compactibility of the product module can be maintained. Further, in the first embodiment, the probe is put on the OLB pad group 20 as conventionally done. Therefore, no high-accuracy and high-priced prober intended for use in the inspection of amorphous silicon is necessary. Thus, it is possible to reduce the manufacturing cost.

If the signal lines 12 are short-circuited, it is not possible to perform a normal display operation. Therefore, after the inspection is completed, the wiring line 32 is disconnected.

Figure 2:
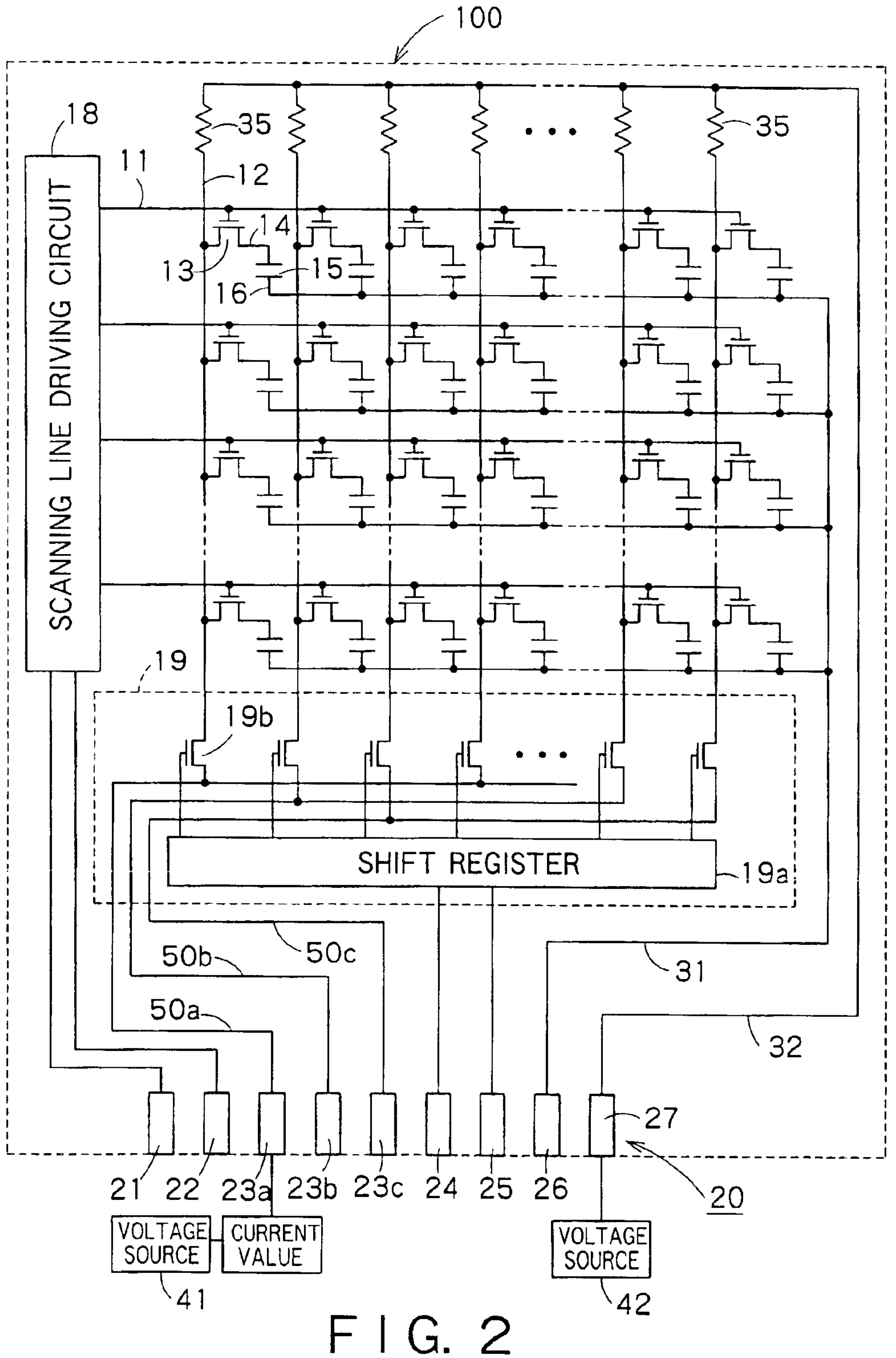
FIG. 2 is an equivalent circuit diagram showing a first modification of the first embodiment.

In the first embodiment shown in FIG. 1, the other ends of the signal lines 12 are directly connected to the wiring line 32. However, as shown in FIG. 2, if a resistor 35 is provided at the other end of each signal line 12, and each signal line 12 is connected to the wiring line 32 via the resistor 35, it is possible to avoid short circuit of signal lines 12 via the wiring line 32.

Figure 3:
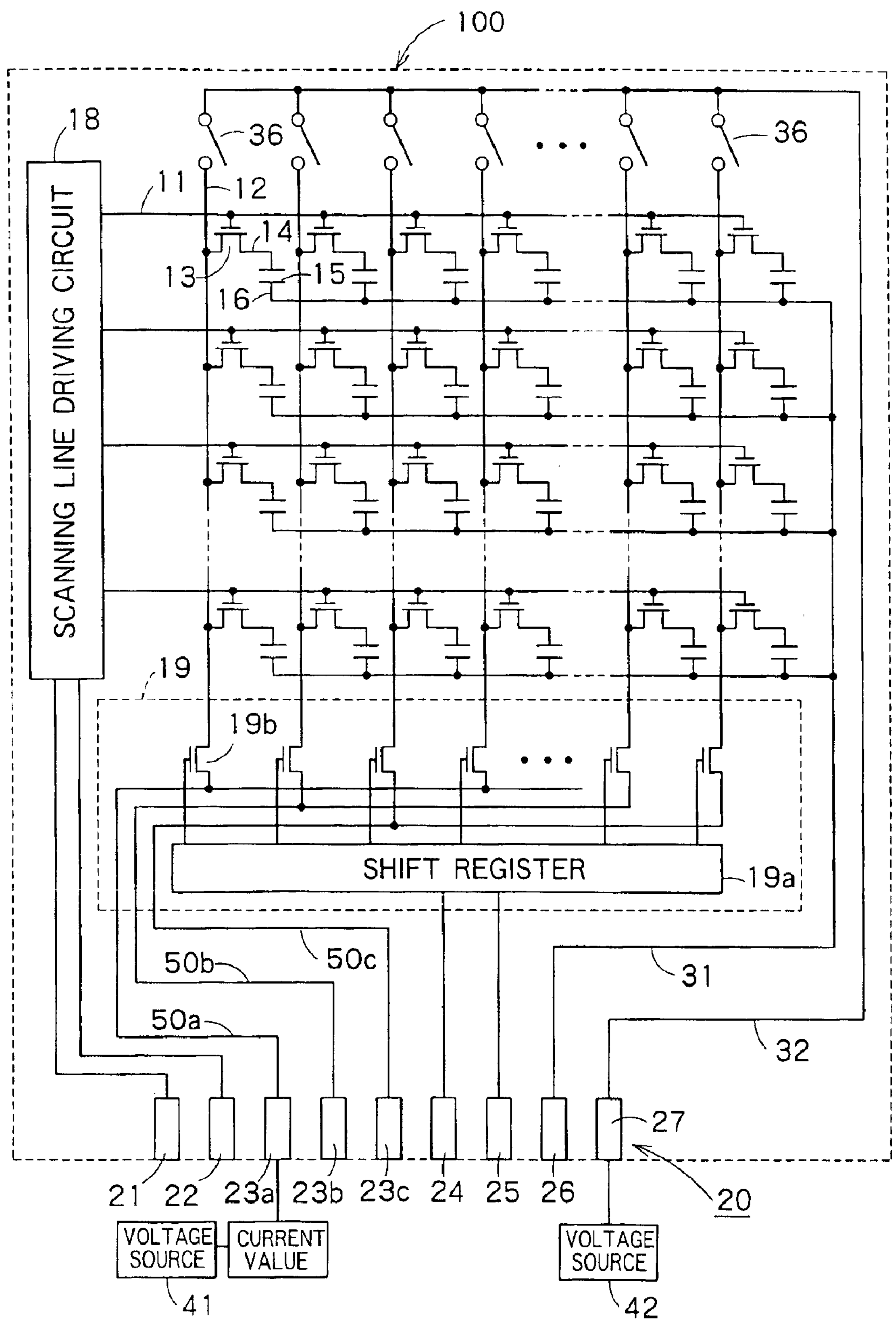
FIG. 3 is an equivalent circuit diagram showing a second modification of the first embodiment.

Further, as shown in FIG. 3, it is possible to provide a switch 36, e.g., a transistor, which can be externally turned on/off, instead of the resistor 35, and to connect each signal line 12 to the wiring line 32 via the switch 36. In this way, it is possible to more reliably secure a current flow at the time of an inspection, and to more reliably avoid a short circuit between the signal lines 12 at the time of non-inspection by tuning on the switches 36 when an inspection of disconnection and short circuit of the video buses 50*a*, 50*b*, and 50*c* and the signal lines 12 is carried out, and turning off the switches 36 in other situations.

(Second Embodiment)

Figure 4:
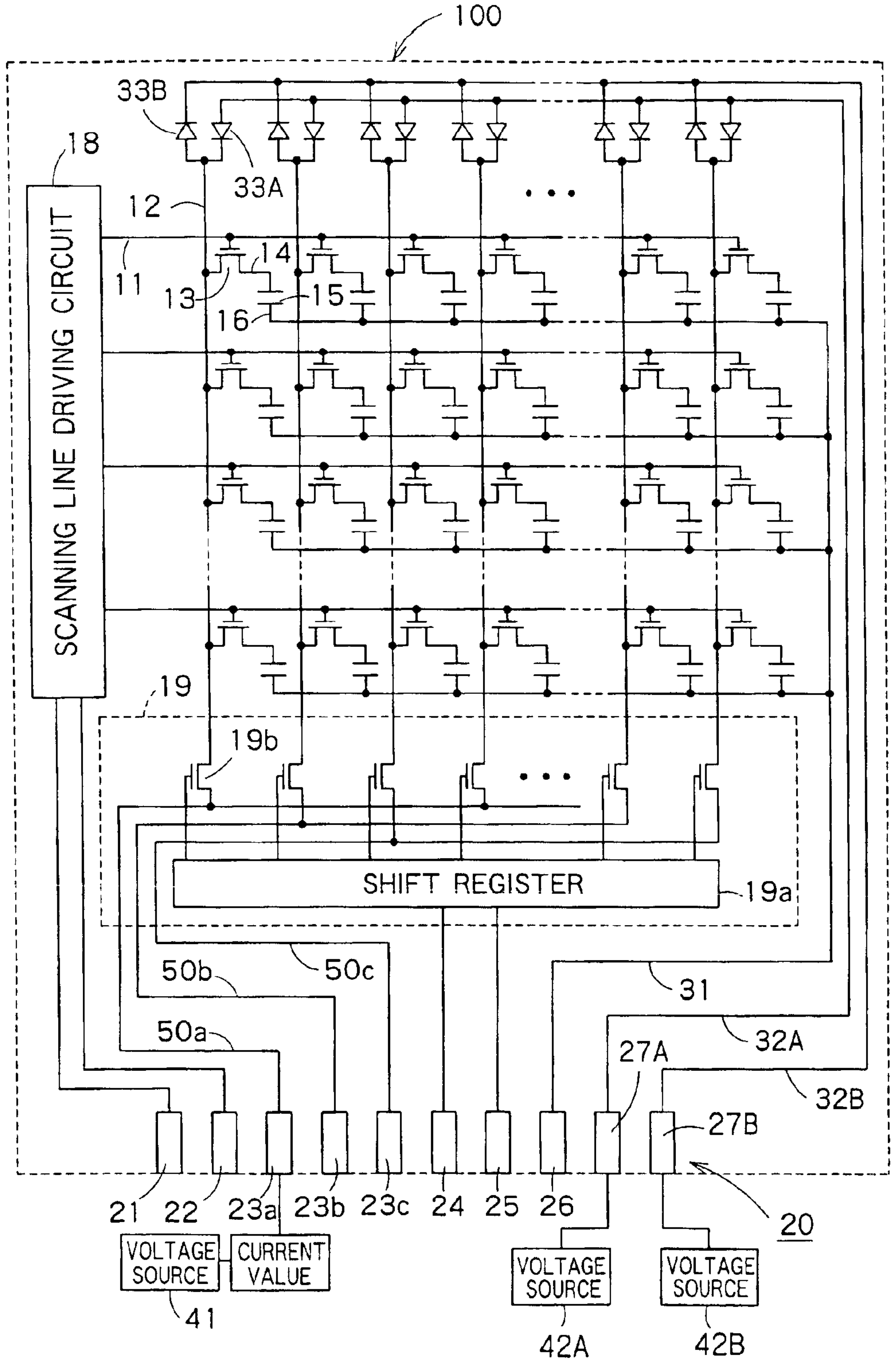
FIG. 4 is an equivalent circuit diagram showing the structure of a second embodiment of a liquid crystal display according to the present invention.

FIG. 4 is an equivalent circuit diagram showing the structure of an array substrate 100 of a second embodiment of a liquid crystal display according to the present invention. In FIG. 4, the elements common to those in FIG. 1 are assigned the same reference numerals, and the explanation thereof is omitted. In this embodiment, wiring lines 32A and 32B are provided on the array substrate 100. One ends of the wiring lines 32A and 32B are connected to an OLB pad 27A and an OLB pad 27B in an OLB pad group 20, respectively, and the other ends thereof are drawn to the side opposite to the OLB pad group, i.e., the upper side in the drawing. A diode 33A is provided on each signal path between the signal lines 12 and the wiring line 32A, and a diode 33B is provided on each signal path between the signal lines 12 and the wiring line 32B. The rest of the configuration of this circuit is the same as that shown in FIG. 1. An anode of a diode 33A is connected to the wiring line 32A on the array substrate, and a cathode thereof is connected to a corresponding signal line 12. On the contrary, an anode of a diode 33B is connected to a corresponding signal line 12 and a cathode thereof is connected to the wiring line 32B on the array substrate.

An inspection method of the second embodiment with the above-described structure, in particular the difference between the second embodiment shown in FIG. 4 and the first embodiment shown in FIG. 1 will be described below.

Diodes 33A and 33B are connected in the directions opposite to each other relative to a corresponding signal line 12. The OLB pad 27A is connected to a voltage source 42A, and the OLB pad 27B is connected to another voltage source 42B. The voltage source 42A applies a potential lower than a normal signal line potential to the wiring line 32A, and the voltage source 42B applies a potential higher than the normal signal line potential to the wiring line 32B. If a potential of a signal line 12 is at a normal level, both the diodes 33A and 33B are turned off, and no current flows therethrough.

At this time, it is assumed that an abnormal voltage is generated on the signal line 12. For example, if the potential of the signal line 12 is lower than the potential of the wiring line 32A, the diode 33A is turned on, and a current flows between the signal line 12 and the wiring line 32A. The current remains flowing until the potential of the signal line 12 is restored to the normal level, i.e., to the level higher than the potential of the wiring line 32A. On the contrary, if the potential of the signal line 12 becomes higher than the normal potential level, the diode 33B is turned on, and a current flows between the signal line 12 and the wiring line 32B. The current remains flowing until the potential of the signal line 12 is restored to the normal level, i.e., to the level lower than the potential of the wiring line 32B. As the result of the above-described operations, the diodes 33A and 33B release the abnormal voltage generated on the signal line 12 to the outside, thereby preventing the signal line 12 from being broken down. Such protecting functions of diodes are disclosed in Japanese Patent Application No. 271514/1998 filed by the same applicant as that of the present application.

In this embodiment including the diodes 33A and 33B having the protecting functions, it is also possible to carry out an OS inspection of the signal lines 12 by measuring the values of currents flowing between the wiring lines 32A and 32B and the video buses 50*a*, 50*b*, and 50*c* outside the OLB pads 23*a*, 23*b*, and 23*c*. That is, if the wiring line 32A is used, the potential of the wiring line 32A is caused to be higher than the normal signal line potential level by the voltage source 42A, to turn on the diodes 33A, thereby ensuring a current path between the video buses 50*a*, 50*b*, and 50*c* and the wiring line 32A. Then, it is possible to detect whether the signal lines 12 and the video buses 50*a*, 50*b*, and 50*c* are broken down (open-circuited) or short-circuited by applying a predetermined level of voltage between the wiring line 32A and the video buses 50*a*, 50*b*, and 50*c* which supply picture signals to the signal lines 12. If the wiring line 32B is used, an OS inspection is carried out after the potential of the wiring line 32B is caused to be lower than the normal signal line potential by the voltage source 42B to turn on the diodes 33B.

At the time of an OS inspection, the potentials of the wiring lines 32A and 32B, the video buses 50*a*, 50*b*, and 50*c*, the Cs lines 16, and the scanning lines 11 are set as shown in the following Table 2.

TABLE 2

| Electrode | Wiring Line 32A | Wiring Line 32B | Video Bus | Cs Line | Scanning Line |
|---|---|---|---|---|---|
| Set Potential | 2 V | 2 V | 5 V | 15 V | −5 V |

In this case, the diode 33B that are connected to the wiring line 32B are turned on. If there is no breakdown or short circuit in the signal lines 12, the voltage on the video buses (5V), the voltage on the wiring line 32B (2V), a current (normal value) determined by the resistance values of the signal lines and the video buses are observed. Hereinafter, changes in current value depending on the types of failures will be described.

(1). Breakdown of Signal Lines 12

If a signal line 12 are broken down, the observed current is substantially at 0 A since there is no current path.

(2). Short Circuit Between Signal Line 12 and Cs Line 16

If a signal lines 12 and a Cs lines 16 are short-circuited, an abnormal current caused by the failure flows from the Cs line 16 having the voltage of 15V toward the video buses 50*a*, 50*b*, and 50*c* having the voltage of 5V. The direction of the abnormal current is opposite to that of the normal current. Therefore, if a short circuit occurs between a signal line 12 and a Cs line 16, the value of the observed current is lower than the normal value.

(3). Short Circuit Between Signal Line 12 and Scanning Line 11

If a signal line 12 and a scanning line 11 are short-circuited, an abnormal current caused by the failure flows from the video buses 50*a*, 50*b*, and 50*c* having the voltage of 5 V toward the scanning line 11 having the voltage of −5 V. The direction of the abnormal current is the same as that of the normal current. Therefore, if a short circuit occurs between the signal line 12 and the scanning line 11, the value of the observed current is higher than the normal value.

The following Table 3 shows the relationships between the normal/abnormal mode and the values of the observed current.

TABLE 3

| Normal/Abnormal (Mode) | Current Observed |
|---|---|
| Signal line normal | Normal value |
| Signal line breakdown | Substantially 0 |
| Short circuit between signal line and Cs line | Lower than normal value |
| Short circuit between signal line and scanning line | Higher than normal value |

Thus, in the second embodiment shown in FIG. 4, it is possible to effectively analyze failures since not only the existence of a failure but also the type of the failure can be determined by appropriately setting the potentials of each line (signal line, scanning line, and Cs line).

Further, in the second embodiment, no probing pad is required between the signal lines 12 and the signal line driving circuit 19 in order to detect breakdown and short circuit of the video busses and the signal lines, as in the case of the first embodiment. Therefore, it is possible to avoid increase in the area of the signal line driving circuit 19, thereby maintaining the compactibility of the product module. Moreover, since the probes are put on the OLB pad group 20, as in the case of the first embodiment, there is no need of providing a high-accuracy and high-priced prober intended for use in the inspection of amorphous silicon, thereby lowering the manufacturing cost.

In the second embodiment, the wiring lines 32A and 32B are not required to be lines specifically used for inspections. For example, it is possible to use the wiring lines 32A and 32B as the power supply lines for the scanning line driving circuit 18 and the signal line driving circuit 19.

(Third Embodiment)

Figure 5:
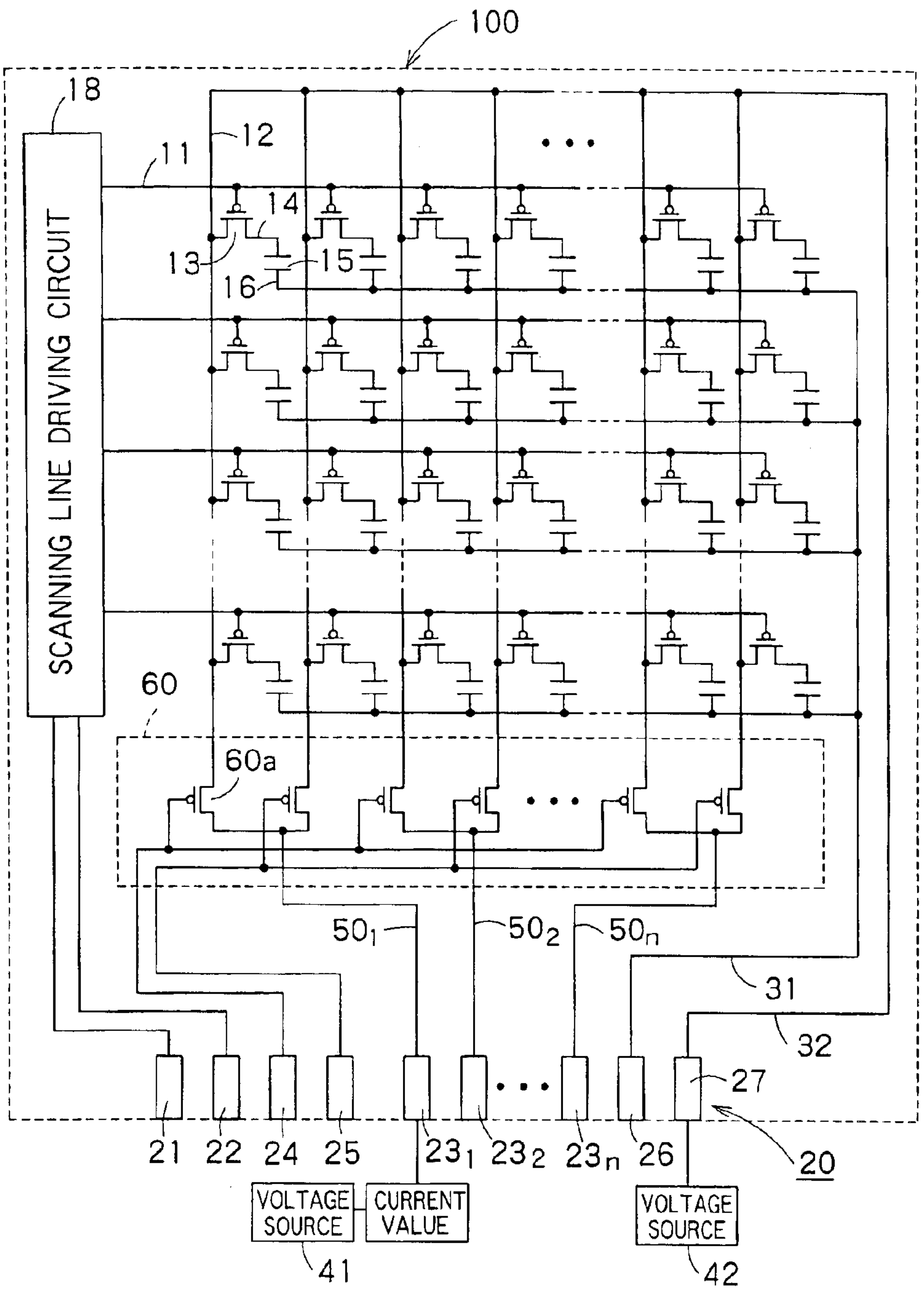
FIG. 5 is an equivalent circuit diagram showing the structure of a third embodiment of a liquid crystal display according to the present invention.

Next, a third embodiment of a liquid crystal display according to the present invention will be described with reference to FIG. 5. The third embodiment is obtained by leaving a part of a signal line driving circuit, e.g., a switching circuit formed of switching elements directly connected to signal lines, on an array substrate of a p-Si type TFT-LCD, and removing the rest of the driving circuit to the outside. FIG. 5 is an equivalent circuit diagram showing the structure of an array substrate 100 of a liquid crystal display according to this embodiment. The array substrate 100 in this embodiment is obtained by replacing the signal line driving circuit 19 with a switching circuit 60 including switching elements 60*a* formed of p-channel TFTs, and replacing the TFTs forming the switching elements 13 and the scanning line driving circuit 18 with p-channel TFTs in the array substrate of the first embodiment shown in FIG. 1.

In the switching circuit 60, one switching element 60*a* is provided for each signal line 12, and a drain of a switching element is connected to the corresponding signal line 12. A source of the switching element 60*a* connected to the (2k−1)-th signal line 12 (k=1, 2, . . . , n) from the left and a source of the switching element 60*a* connected to the (2k)-th signal line 12 are connected in common with the OLB pad 23*k* via the video bus 50*k*. Further, gates of the switching elements 60*a* connected to the odd-numbered signal lines 12 (numbered from the left) are commonly connected to the OLB pad 24, and gates the switching elements 60_a_ connected to the even-numbered signal lines 12 (numbered from the left) are commonly connected to the OLB pad 25. Accordingly, in the third embodiment, a picture signal is first sent to an odd-numbered signal line 12, and then sent to an even-numbered signal line 12. However, a picture signal may be first sent to an even-numbered signal line 12, and then sent to an odd-numbered signal line 12.

In the array substrate thus constituted of this embodiment, a breakdown or short circuit of the signal lines 12 and the video bus 50_i_ supplying picture signals to the signal lines 12 can be easily detected by, e.g., connecting a power source 41 to the OLB pad 23_i_ (i=1, 2, . . . , n), connecting another power source 42 to the OLB pad 27, applying a predetermined level of test voltage between the OLB pad 23_i_ and the OLB pad 27, and measuring the value of current flowing from the voltage source 41 to the OLB pad 23_i_.

According to the third embodiment, no probing pad is required between the signal lines 12 and the signal line driving circuit (switching circuit 60) provided on the array substrate in order to detect breakdown and short circuit of the video bus 50_i_ (i=1, 2, . . . , n) and the signal lines 12. Therefore, the increase in area of the signal line driving circuit (switching circuit 60) can be avoided, thereby maintaining the compacitibility of the product module.

In the liquid crystal display in this embodiment, a picture element inspection by the use of Cs lines 16 is carried out via the switching circuit 60 provided on the array substrate 100. Therefore, as compared to the case of a p-Si type TFT-LCD building in a signal line driving circuit 19, a higher S/N ratio can be obtained.

It should be noted that when the signal lines 12 are short-circuited, normal display operations cannot be performed. Therefore, after the above-described inspection is carried out, the wiring line 32 is disconnected.

Figure 6:
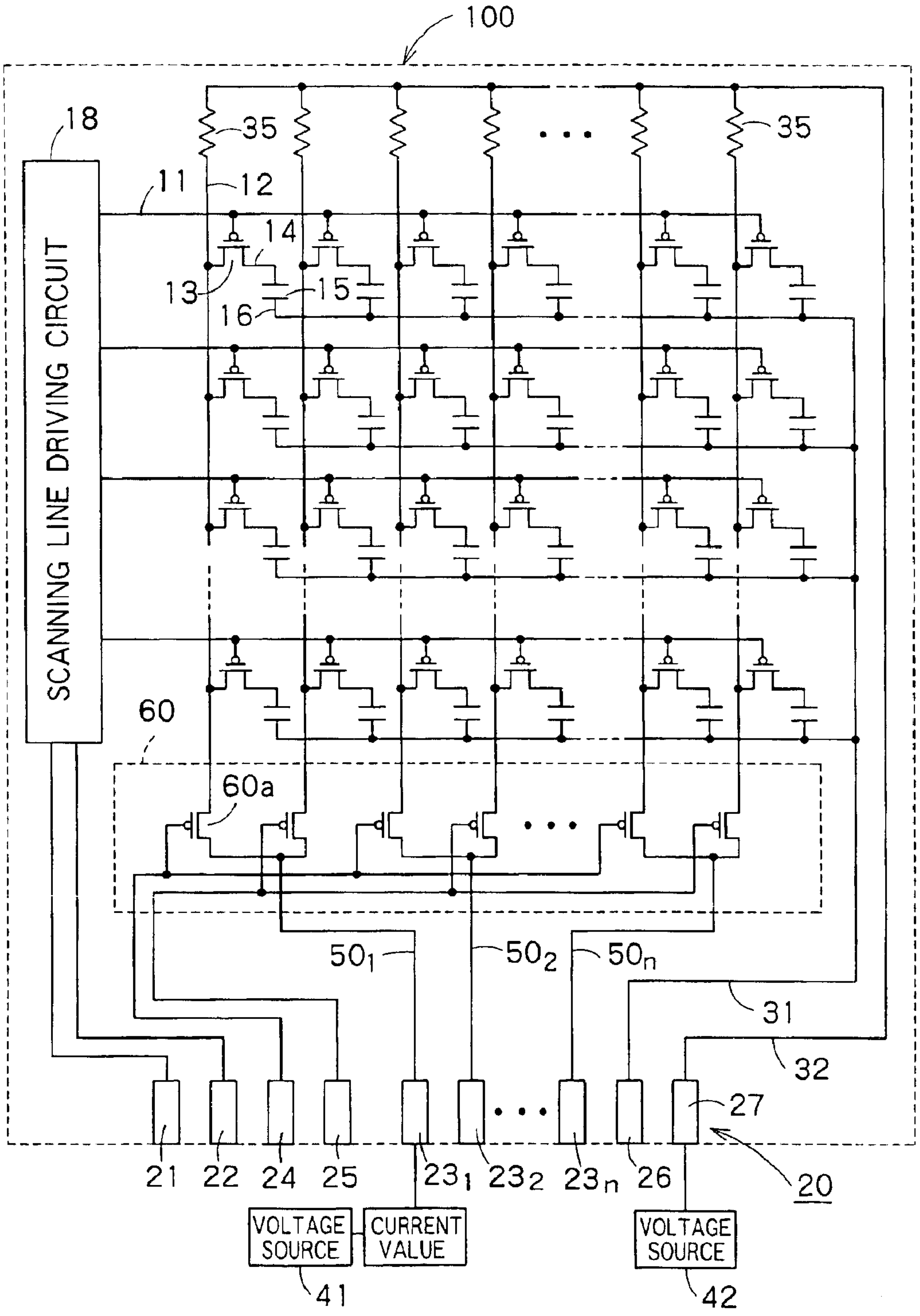
FIG. 6 is an equivalent circuit diagram showing a first modification of the third embodiment.

In FIG. 5, the other ends of the signal lines 12 are directly connected to the wiring line 32. However, as shown in FIG. 6, it is possible to provide a resistor 35 at each the other end of the signal lines 12, and to connect the signal lines 12 to the wiring line 32 via the resistors 35, thereby preventing the occurrence of a short circuit of the signal lines 12 via the wiring line 32.

Figure 7:
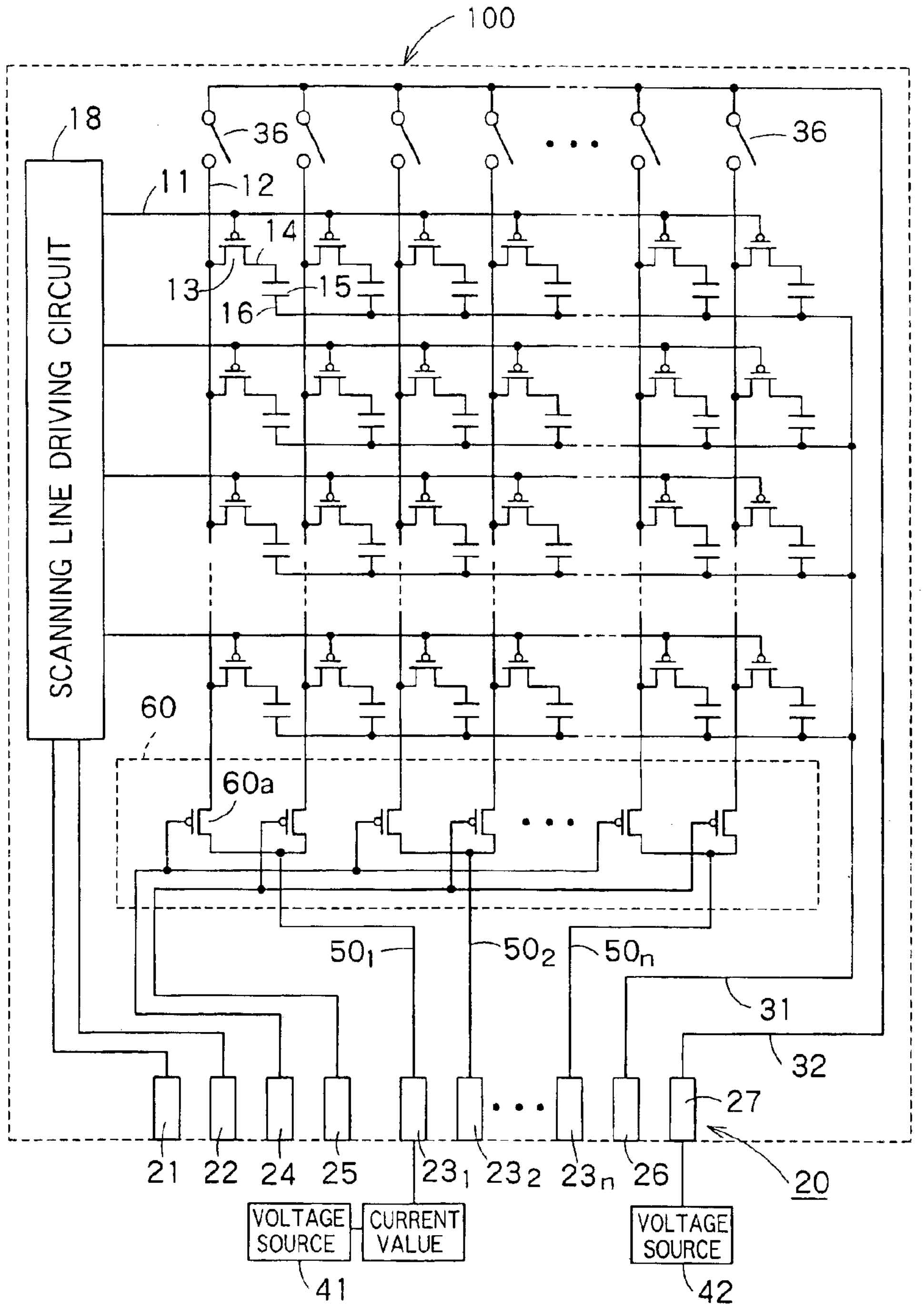
FIG. 7 is an equivalent circuit diagram showing a second modification of the third embodiment.

Further, as shown in FIG. 7, it is possible to provide a switch 36, e.g., a transistor, which can be externally turned on/off, instead of the resistor 35, and to connect each signal line 12 to the wiring line 32 via the switch 36. In this way, it is possible to more reliably secure a current flow at the time of an inspection, and to more reliably avoid short circuit between the signal lines 12 at the time of non-inspection by tuning on the switches 36 when an inspection of disconnection and short circuit of the video bus 50_i_ (i=1, 2, . . . , n), and the signal lines 12 is carried out, and turning off the switches 36 in other situations.

(Fourth Embodiment)

Figure 8:
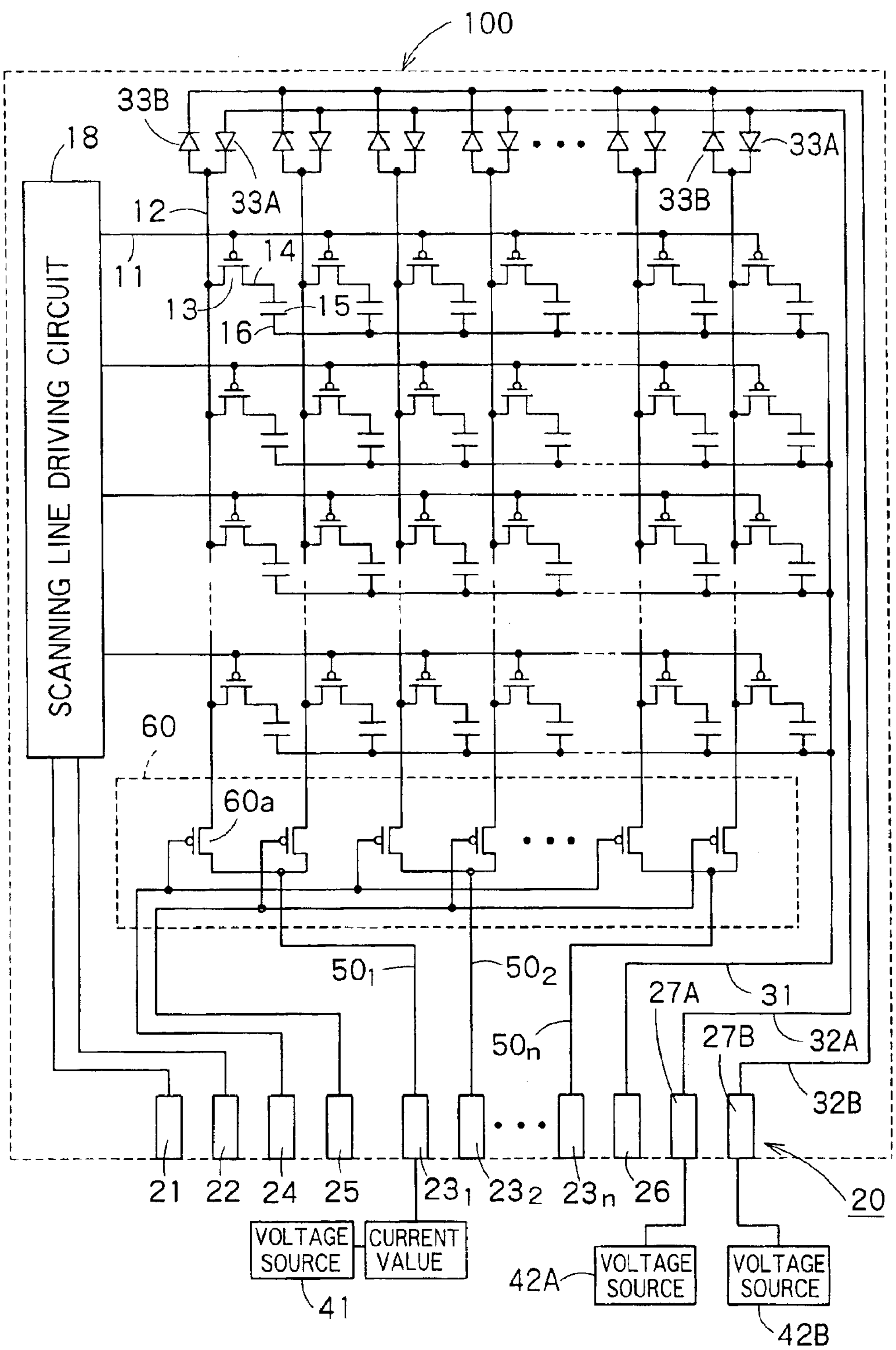
FIG. 8 is an equivalent circuit diagram showing the structure of a fourth embodiment of a liquid crystal display according to the present invention.

Next, a fourth embodiment of a liquid crystal display according to the present invention will be described with reference to FIG. 8. FIG. 8 is an equivalent circuit diagram of an array substrate of the liquid crystal display in the fourth embodiment. The array substrate 100 is obtained by replacing the wiring line 32 with wiring lines 32A and 32B, replacing the OLB pad 27 with an OLB pad 27A connected to the wiring line 32A and an OLB pad 27B connected to the wiring line 32B, and adding diodes 33A for connecting the signal lines 12 to the wiring line 32A and diodes 33B for connecting the signal lines 12 to the wiring line 32B. An anode of a diode 33A is connected to the wiring line 32A, and a cathode thereof is connected to a signal line 12. An anode of a diode 33B is connected to a signal line 12, and a cathode thereof is connected to the wiring line 32B.

An inspection of the array substrate in this embodiment thus constituted can be performed in a manner similar to that of the second embodiment shown in FIG. 4. That is, it is possible to determine not only the existence of a failure but also the type of the failure by appropriately setting the potentials of each line (signal line, scanning line, and Cs line) in a manner similar to that of the second embodiment.

In the liquid crystal display in this embodiment, an picture element inspection by the use of Cs lines 16 is carried out via the switching circuit 60 provided on the array substrate 100. Therefore, as compared to the case of a p-Si type TFT-LCD building in a signal line driving circuit 19, a higher S/N ratio can be obtained.

(Fifth Embodiment)

Figure 9:
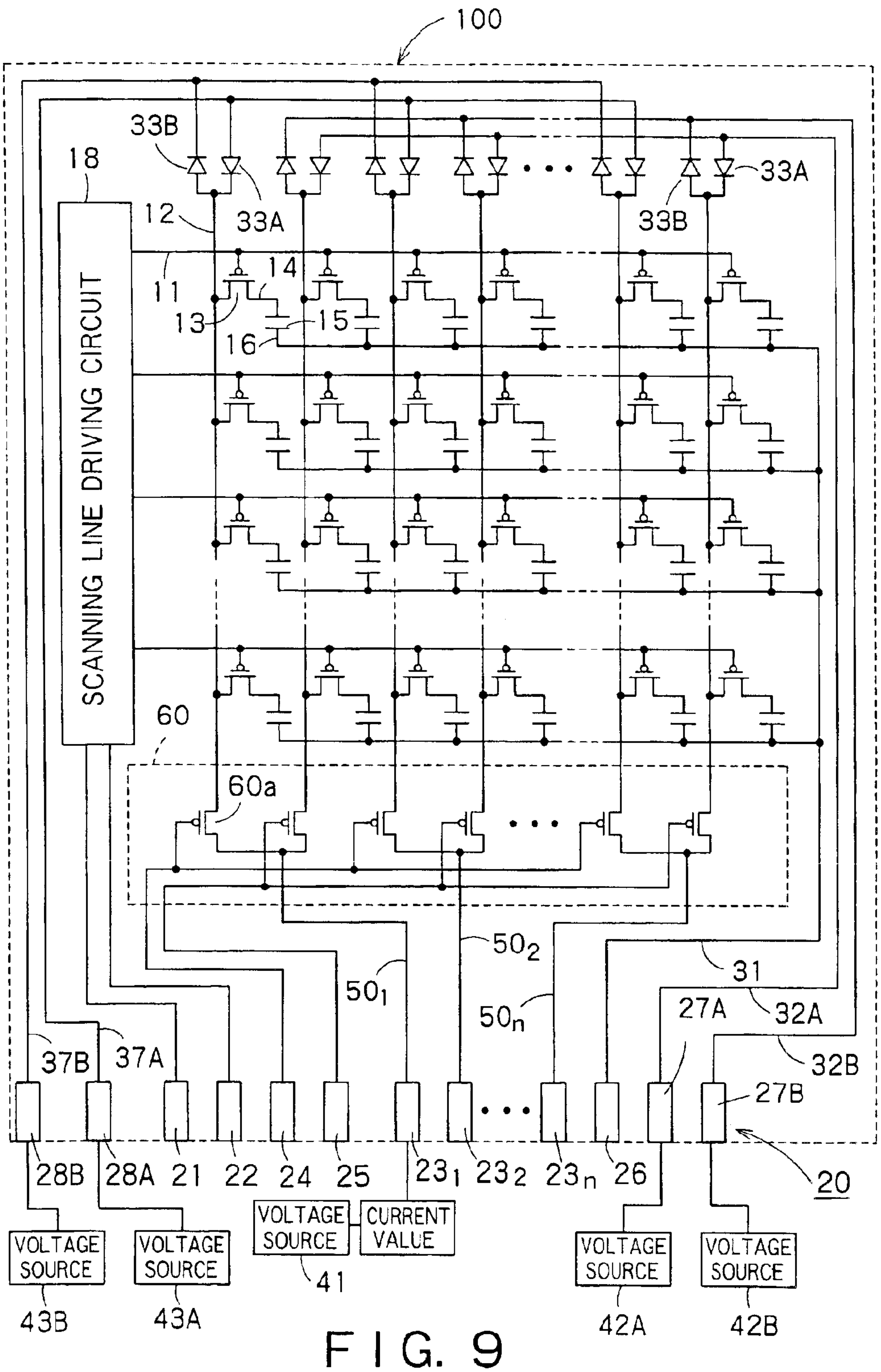
FIG. 9 is an equivalent circuit diagram showing the structure of a fifth embodiment of a liquid crystal display according to the present invention.
Figure 10:
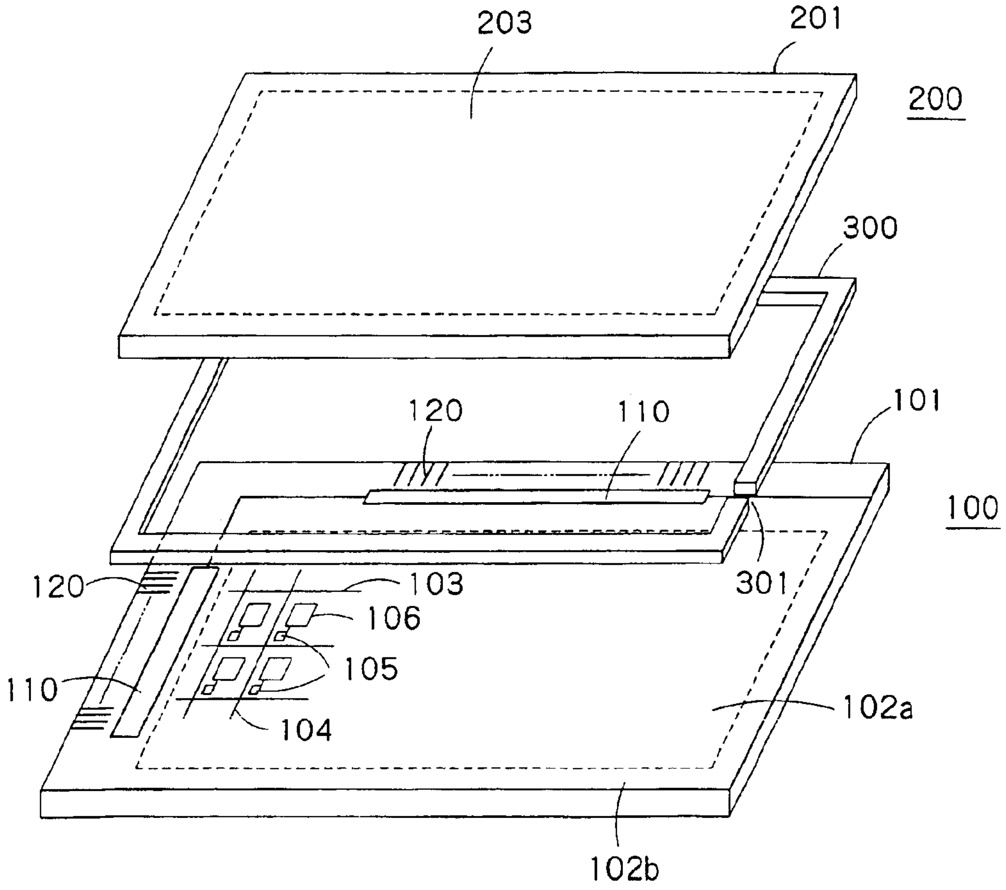
F I G. 10 BACKGROUND ART
FIG. 10 shows a typical structure of an active matrix type liquid crystal display.
Figure 11:
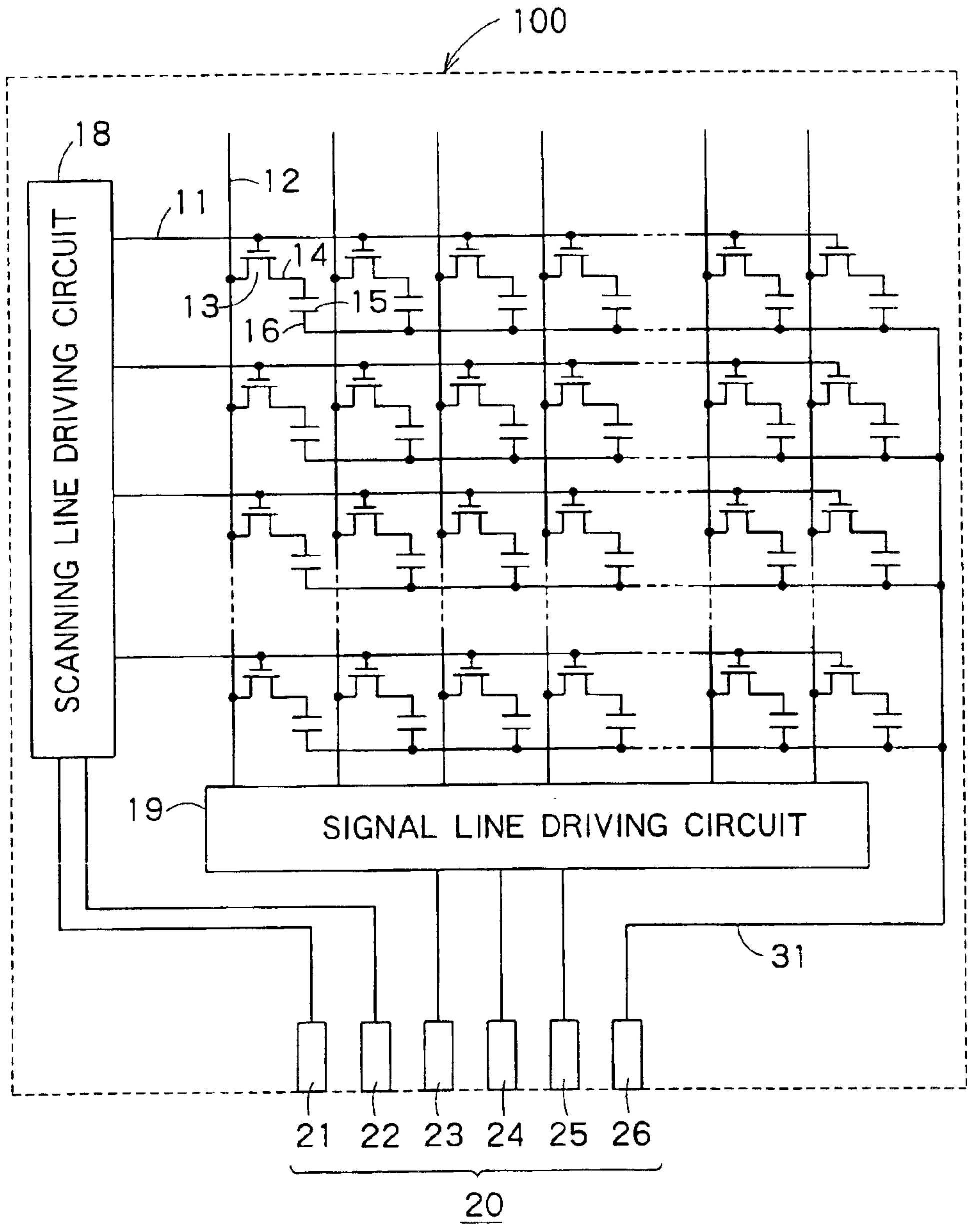
FIG. 11 BACKGROUND ART
FIG. 11 is an equivalent circuit diagram showing the structure of a conventional polycrystalline silicon type liquid crystal display.
Figure 12:
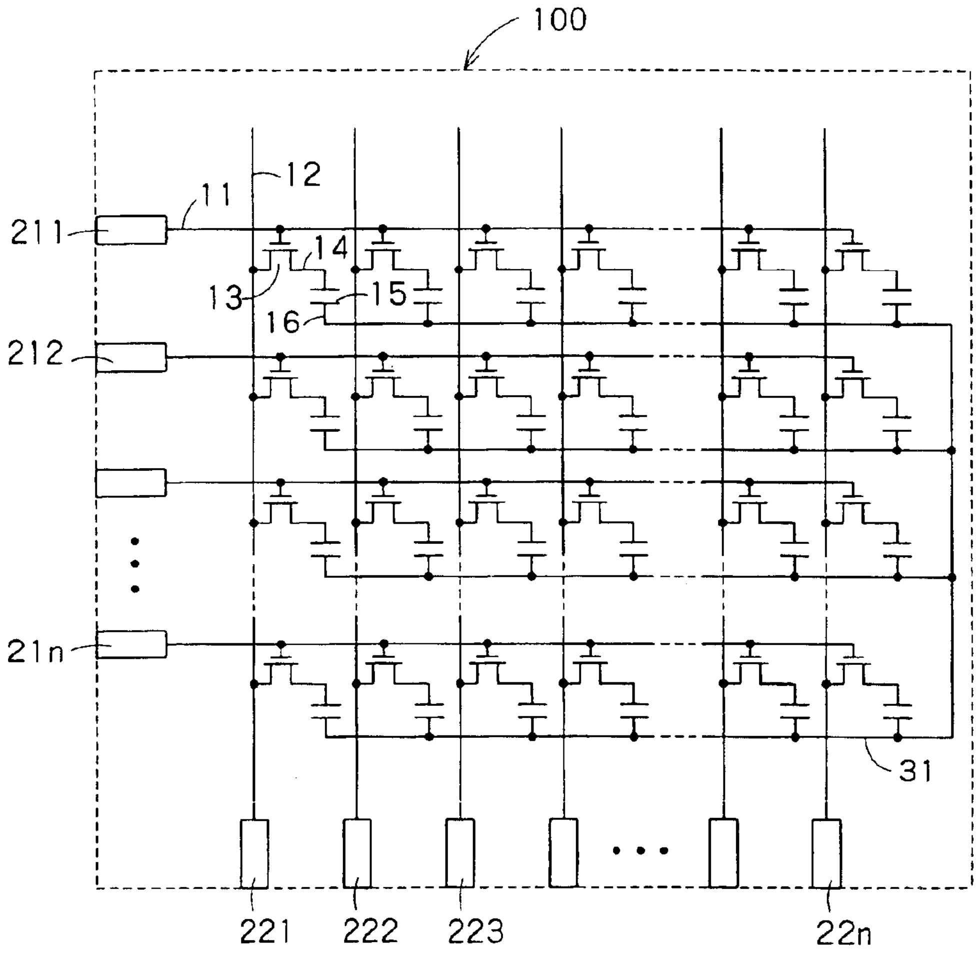
F I G. 12 BACKGROUND ART
FIG. 12 is an equivalent circuit diagram showing the structure of a conventional amorphous silicon type liquid crystal display.

Next, a fifth embodiment of a liquid crystal display according to the present invention will be described with reference to FIG. 9. FIG. 9 is an equivalent circuit diagram of an array substrate of a liquid crystal display in the fifth embodiment. The array substrate 100 is obtained by adding wiring lines 37A and 37B, an OLB pad 28A connected to the wiring line 37A, and an OLB pad 28B connected to the wiring line 37B to the array substrate 100 of the fourth embodiment shown in FIG. 8. In this embodiment, the diodes 33A and 33B connected to the even-numbered signal lines 12 (numbered from the left) are connected to the OLB pads 27A and 27B via the wiring lines 32A and 32B, respectively, and the diodes 33A and 33B connected to the odd-numbered signal lines 12 are connected to the OLB pads 28A and 28B via the wiring lines 37A and 37B. Anodes of the diodes 33A connected to the even-numbered signal lines 12 are connected to the wiring line 32A, and cathodes thereof are connected to the above even-numbered signal lines. Anodes of the diodes 33B connected to the even-numbered signal lines 12 are connected to the above even-numbered signal lines 12, and cathodes thereof are connected to the wiring line 32B. Anodes of the diodes 33A connected to the odd-numbered signal lines are connected to the wiring line 37A, and cathodes thereof are connected to the above odd-numbered signal lines 12. Anodes of the diodes 33B connected to the odd-numbered signal lines 12 are connected to the above odd-numbered signal lines 12, and cathodes thereof are connected to the wiring line 37B.

In the fifth embodiment thus constituted, it is possible to determine not only the existence of a failure but also the type of the failure by appropriately setting the potentials of each line (signal line, scanning line, and Cs line) in a manner similar to that of the fourth embodiment.

Further, in the fifth embodiment, it is possible to apply different voltages to the odd-numbered signal lines and the even-numbered signal lines. Therefore, it is possible to detect a short circuit between adjacent signal lines by inspecting the odd-numbered signal lines, and at the same time applying a voltage to adjacent even-numbered signal lines.

In the liquid crystal display in this embodiment, a picture element inspection by the use of Cs lines 16 is carried out via the switching circuit 60 provided on the array substrate 100. Therefore, as compared to the case of a p-Si type TFT-LCD building in a signal line driving circuit 19, a higher S/N ratio can be obtained.

As mentioned previously, according to the present invention, it is possible to perform an OS inspection of array substrate without increasing in size of the signal line driving circuit formed on the array substrate. Further, it is possible to reduce the manufacturing cost.

What is claimed is:

1. An array substrate comprising:

a substrate;

a plurality of scanning lines formed on the substrate;

a plurality of signal lines formed on the substrate so as to intersect the scanning lines, each signal line having one end and the other end;

thin film transistors provided at intersections of the scanning lines and the signal lines, a gate of each thin film transistor being connected to the corresponding scanning line, and a source thereof being connected to the corresponding signal line;

pixel electrodes each corresponding to one of the thin film transistors, and each being connected to a drain of the corresponding thin film transistor;

an input/output terminal group provided at an edge portion of the substrate, including input/output terminals used for inputting signals from the outside and outputting signals to the outside;

a scanning line driving circuit for driving the scanning lines;

a signal line driving circuit, connected to the one end of each signal line, for driving the signal lines;

a first wiring line formed on the substrate, connected to at least one of the input/output terminals in the input/output terminal group; and diodes each connecting the other end of each of the signal lines to the first wiring lines, wherein the first wiring line includes a second wiring line and a third wiring line connected to the different input/output terminals, and a first diode and a second diode are provided to the other end of each signal line, an anode of the first diode being connected to the other end of the signal line, a cathode thereof being connected to the second wiring line, an anode of the second diode being connected to the third wiring line, and a cathode thereof being connected to the other end of the signal line.

2. The array substrate according to claim 1, further including:

storage capacitors each corresponding to one of the pixel electrodes and one end of each being connected to the corresponding pixel electrode; and storage capacitor lines each connected to the other end of each storage capacitor, wherein the storage capacitor lines are commonly connected to one of the input/output terminals in the input/output terminal group.

3. The array substrate according to claim 1, further including a video bus connected to at least one of the input/output terminals of the input/output terminal group, wherein the signal line driving circuit includes selecting switches each corresponding to a signal line, one end of each selecting switch being connected to the corresponding signal line, and the other end thereof being connected to the video bus.

4. The array substrate according to claim 3, further including:

storage capacitors each corresponding to one of the pixel electrodes, and one end of each being connected to the corresponding pixel electrode; and storage capacitor lines each connected to the other end of each storage capacitor, wherein the storage capacitor lines are commonly connected to one of the input/output terminals in the input/output terminal group.

5. The array substrate according to claim 3, wherein the other ends of the selecting switches, one ends of which are connected to the (2k−1)-th signal line and the (2K)-th signal line, counted from one side, where k is a natural number, are commonly connected to the video bus.

6. A liquid crystal display comprising:

the array substrate according to claim 1;

an opposite substrate formed of a second substrate, including a common electrode; and a liquid crystal layer provided between the array substrate and the opposite substrate.

7. A method of inspecting the array substrate according to claim 1, comprising:

applying a predetermined level of voltage between the input/output terminal to which the first wiring line is connected and another input/output terminal which at least supplies picture signals; and measuring a current flowing through the input/output terminals to which the predetermined level of voltage is applied.

* * * * *